(12) United States Patent
McGlinchey et al.

(10) Patent No.: US 7,036,079 B2
(45) Date of Patent: Apr. 25, 2006

(54) IMPORTATION OF AUTOMATICALLY GENERATED CONTENT

(75) Inventors: Andrew J. McGlinchey, Seattle, WA (US); Aravind Bala, Bellevue, WA (US); James D. Jacoby, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 80 days.

(21) Appl. No.: 10/887,543

(22) Filed: Jul. 8, 2004

(65) Prior Publication Data

US 2004/0255270 A1    Dec. 16, 2004

Related U.S. Application Data

(63) Continuation-in-part of application No. 10/337,745, filed on Jan. 7, 2003.

(51) Int. Cl.
*G06F 3/00* (2006.01)
(52) U.S. Cl. ........................ 715/704; 715/751
(58) Field of Classification Search ........ 715/751–759, 715/704
See application file for complete search history.

(56) References Cited

U.S. PATENT DOCUMENTS 6,532,023 B1   3/2003   Schumacher et al. ....... 345/704

2004/0261026 A1   12/2004   Corson ....................... 715/704

FOREIGN PATENT DOCUMENTS

WO    PCT/US04/22450    8/2004

OTHER PUBLICATIONS

C. F. Drew, "A Natural Language Interface for Expert System Help Desk", IEEE Conference on Managing Expert System Programs and Projects, pp. 209-215, Sep. 10-12, 1990.
J. Marx et al., "WING: An Intelligent Multimodal Interface for a Materials Information System", 14th Information Retrieval Colloquium, pp. 67-78, Apr. 13-14,1992.
S. Di Segni, "Goethe: A Natural Language Help System in Prolog an Experiment with the Lexicon Driven Approach", Thirteenth International Conference Artificial Intelligence Expert Systems Natural Language, Avignon, France, vol. 3, pp. 223-232, May 24-28, 1993.

*Primary Examiner*—Kristine Kincaid
*Assistant Examiner*—Lé Nguyen
(74) *Attorney, Agent, or Firm*—Joseph R. Kelly; Westman, Champlin & Kelly, P.A.

(57) ABSTRACT

The present invention is directed to a system for automatically recording information indicative of actions of an author in completing steps in an overall task performed on a user interface. Recording systems are used to record the steps taken to perform the task on different computers having different configurations. The recorded steps are then imported into an authoring component where the recorded steps are arranged into a desired content.

20 Claims, 11 Drawing Sheets

IMPORTATION OF AUTOMATICALLY GENERATED CONTENT

RELATED APPLICATIONS

The present invention is a continuation-in-part of co-pending related U.S. patent application Ser. No. 10/337,745, filed Jan. 7, 2003, entitled ACTIVE CONTENT WIZARD: EXECUTION OF TASKS AND STRUCTURED CONTENT; Reference is made to U.S. patent applications Ser. No. 10/887,058, filed Jul. 8, 2004, entitled AUTOMATIC TEXT GENERATION; and U.S. patent applications Ser. No. 10/887,414, filed Jul. 8, 2004, entitled AUTOMATIC IMAGE CAPTURE FOR GENERATING CONTENT, and assigned to the same assignee as the present invention.

BACKGROUND OF THE INVENTION

The present invention deals with generating content, such as help content. More specifically, the present invention deals with importation of automatically generated content indicative of actions of a user on a user interface.

The Graphical User Interface (GUI) is a widely used interface mechanism. GUI's are very good for positioning tasks (e.g. resizing a rectangle), visual modifier tasks (e.g. making something an indescribable shade of blue) or selection tasks (e.g. this is the one of a hundred pictures I want rotated). The GUI is also good for speedy access to quick single step features. An application's GUI is a useful toolbox that is organized from a functional perspective (e.g. organized into menus, toolbars, etc) rather than a task oriented perspective (e.g. organized by higher level tasks that users want to do, such as "make my computer secure against hackers").

However, GUIs present many problems to the user as well. Using the toolbox analogy, a user has difficulty finding the tools in the box or figuring out how to use the tools to complete a task composed of multiple steps. An interface described by single words, tiny buttons and tabs forced into an opaque hierarchy does not lend itself to the way people think about their tasks. The GUI requires the user to decompose the tasks in order to determine what elements are necessary to accomplish the task. This requirement leads to complexity. Aside from complexity, it takes time to assemble GUI elements (i.e. menu clicks, dialog clicks, etc). This can be inefficient and time consuming even for expert users.

One existing mechanism for addressing GUI problems is a written help procedure. Help procedures often take the form of Help documents, PSS (Product support services) KB (Knowledge base) articles, and newsgroup posts, which fill the gap between customer needs and GUI problems. They are analogous to the manual that comes with the toolbox, and have many benefits. These benefits include, by way of example:

1) Technically speaking, they are relatively easy to author even for non-technical authors;
2) They are easy to update on a server so connected users have easy access to new content; and
3) They teach the GUI thereby putting users in control of solving problems.

However, Help documents, PSS KB articles and newsgroups have their own set of problems. These problems include, by way of example:

1) Complex tasks require a great deal of processing on the user's part. The user needs to do the mapping from what is said in each step to the GUI. This can lead to errors in that steps are skipped, described incorrectly or inadequately or are described out of order.
2) Troubleshooters., and even procedural help documents, often include state information that creates complex branches within the help topic, making topics long and hard to read and process by the end user. Toolbars may be missing, and may need to be turned on before the next step can be taken. Troubleshooters often ask questions about a state that is at best frustrating (because the troubleshooter should be able to find the answer itself) and at worst unanswerable by non-experts.
3) There are millions of documents, and searching for answers involves both a problem of where to start the search, and then how to pick the best search result from the thousands returned.
4) There is no shared authoring structure. Newsgroup posts, KB articles, troubleshooters and procedural Help documents all have different structures and authoring strategies, yet they are all solving similar problems.
5) For a user, it is simply difficult to read step-by-step text, and then visually search the UI for the element being described and take the action described with respect to that element.

Another existing mechanism for addressing GUI problems is a Wizard. Wizards were created to address the weaknesses of GUI and written help procedures. There are now thousands of wizards, and these wizards can be found in almost every software product that is manufactured. This is because wizards solve a real need currently not addressed by existing text based help and assistance. They allow users to access functionality in a task-oriented way and can assemble the GUI or tools automatically. Wizards allow a program manager and developer a means for addressing customer tasks. They are like the expert in the box stepping the user through the necessary steps for task success. Some wizards help customers setup a system (e.g. Setup Wizards), some wizards include content with features and help customers create content (e.g. Newsletter Wizards or PowerPoint's AutoContent Wizard), and some wizards help customers diagnose and solve problems (e.g. Troubleshooters).

Wizards provide many benefits to the user. Some of the benefits of wizards are that:

1) Wizards can embody the notion of a "task." It is usually clear to the user what the wizard is helping them accomplish. With step-by-step pages, it can be easy for a user to make choices, and in the case of well designed wizards the incidence of the user becoming visually overwhelmed is often reduced.
2) Wizards can automatically assemble and interact with the underlying features of the software and include the information or expertise needed for customers to make choices. This saves the user time in executing the task.
3) Wizards can automatically generate content and can save users time by creating text and planning layout.
4) Wizards are also a good means for asking questions, getting responses and branching to the most relevant next question or feature.

However, wizards too, have their own set problems. Some of these problems include, there are many more tasks that people try to accomplish than there are wizards for accomplishing them. Wizards and IUI (Inductive User Interfaces) do not teach customers how to use underlying GUI and often when the Wizard is completed, users are unsure of where to go next. The cost of authoring of wizards$_{[AMcG1]}$ is still high and requires personnel with technical expertise (e.g. software developers) to author the Wizard.

Further, all of these types of content suffer from yet another problem. The steps that must be taken to perform any given task may change based on the configuration of the computer on which the task is to be performed. For instance, changing the background display (or "wallpaper") on a computer may require the user to perform different steps, depending on the operating system of the user's computer. In fact, the steps required may even be different if the version number of the operating system is different. Similarly, the steps may be different depending on the network configuration of the computer (e.g., depending on whether the computer is on a network domain or on a workgroup). This requires the user to author fairly complicated branching logic in the written content. Also, the user may find it quite cumbersome to navigate through a complicated branching help text to perform necessary steps.

Thus, authoring all of these types of content that describe procedures to be taken by a user, is often error prone. It is quite easy to miss steps, to describe steps incorrectly, or to lose track of what step is currently being described in a long sequence of UI manipulations. However, this written procedural help content is extremely common. Such help content often ships with products, on-line help content is provided for product support teams, and procedures inside companies are often documented in this way for specific business processes. Thus, this type of information is difficult to author and often contains errors.

In addition, end users must typically follow the steps that have been authored. It can be difficult to read step-by-step text, and then search the UI for the particular control element being described and then to take the proper action with respect to that control element. It has been found that many users find this such a burden that they simply scan the first one or two steps of the text, and then try their best to determine which UI elements need to be actuated next, barely referring back to the written text steps. It has also been found that the eye can find and recognize pictures much more easily than it can read a word, mentally convert the word into a picture, and then find the corresponding UI control element. Yet, in the past, this is exactly what was done, as an author must painstakingly take screenshots of each step, crop the images, and paste them into a document in the right place, in order to have any type of visual depiction of an action to be taken.

SUMMARY OF THE INVENTION

One embodiment of the present invention addresses some of the problems of Wizards, Help, Knowledge base articles and troubleshooters by providing a content component that allows for an easy way to author thousands of tasks (or wizards), and either integrate with the GUI and teach the user how to use the GUI to execute the task or to execute the task on behalf of the user. In one specific embodiment, the present invention deals with authoring active content wizard (ACW) scripts, and with the text and images that are part of an ACW script.

The present invention is directed to a system for automatically recording information indicative of actions of an author in completing steps in an overall task performed on a user interface. Recording systems are used to record the steps taken to perform the task on different computers having different configurations. The recorded steps are then imported into an authoring component where the recorded steps are arranged into a desired content.

In one embodiment, the recording system records images corresponding to the author's actions on the user interface. The recording system can then pass the recorded images to an authoring component where an author can generate text corresponding to the images to describe the actions. The images can also be published embedded in the text, if desired.

In one embodiment, the recording system includes a text generator that automatically generates text corresponding to the images. This text can then be used to form a text document, which provides instructions or other information to a user. During or after the process of generating the text document, the text can be edited using an editor to enhance the comprehensibility of the document.

DETAILED DESCRIPTION OF ILLUSTRATIVE EMBODIMENTS

The present invention deals with automatically recording content indicative of a user action on a user interface. Prior to describing the present invention in greater detail, one exemplary environment in which the invention can be used will be discussed.

Figure 1:
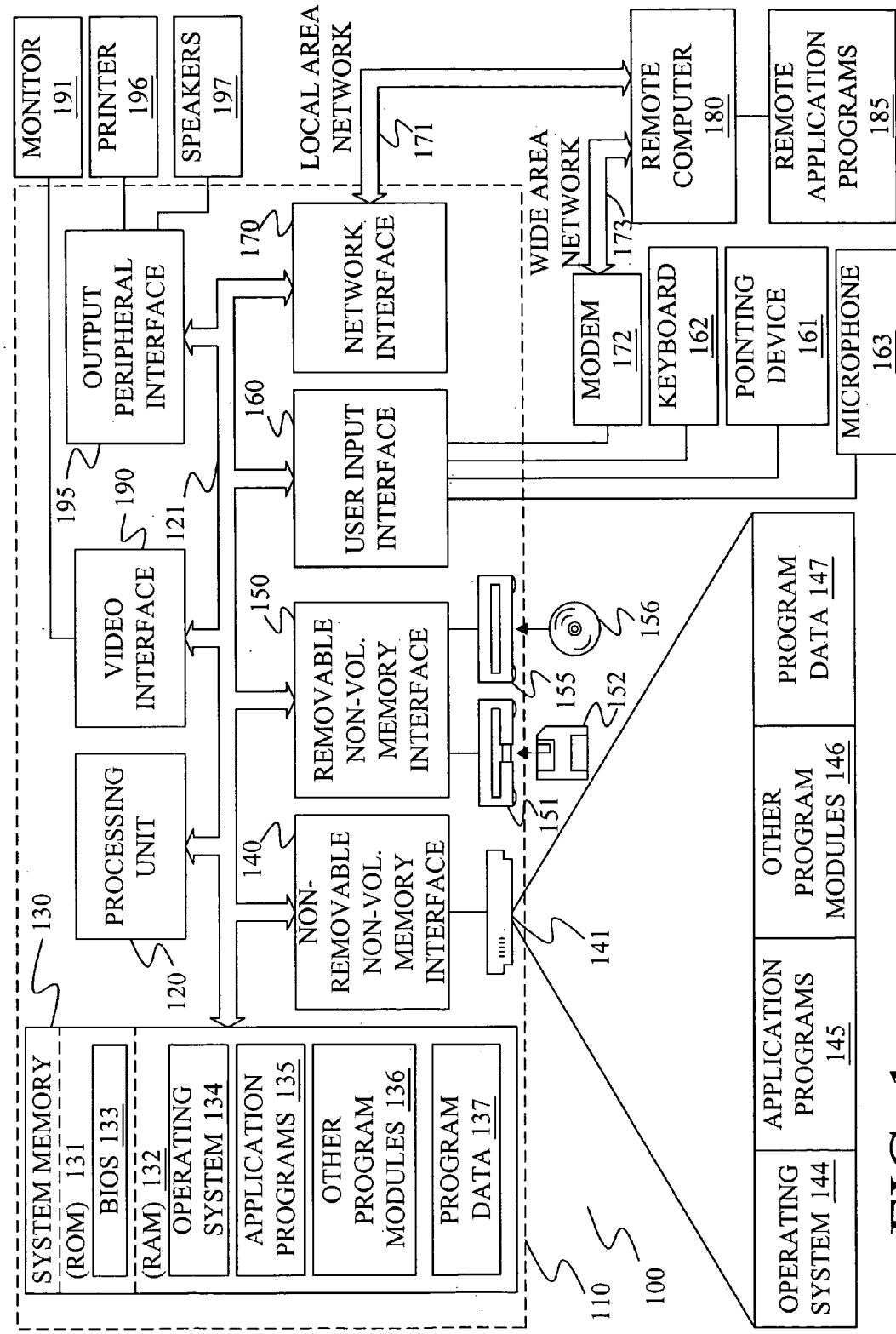
FIG. 1 is a block diagram of one exemplary environment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessorbased systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
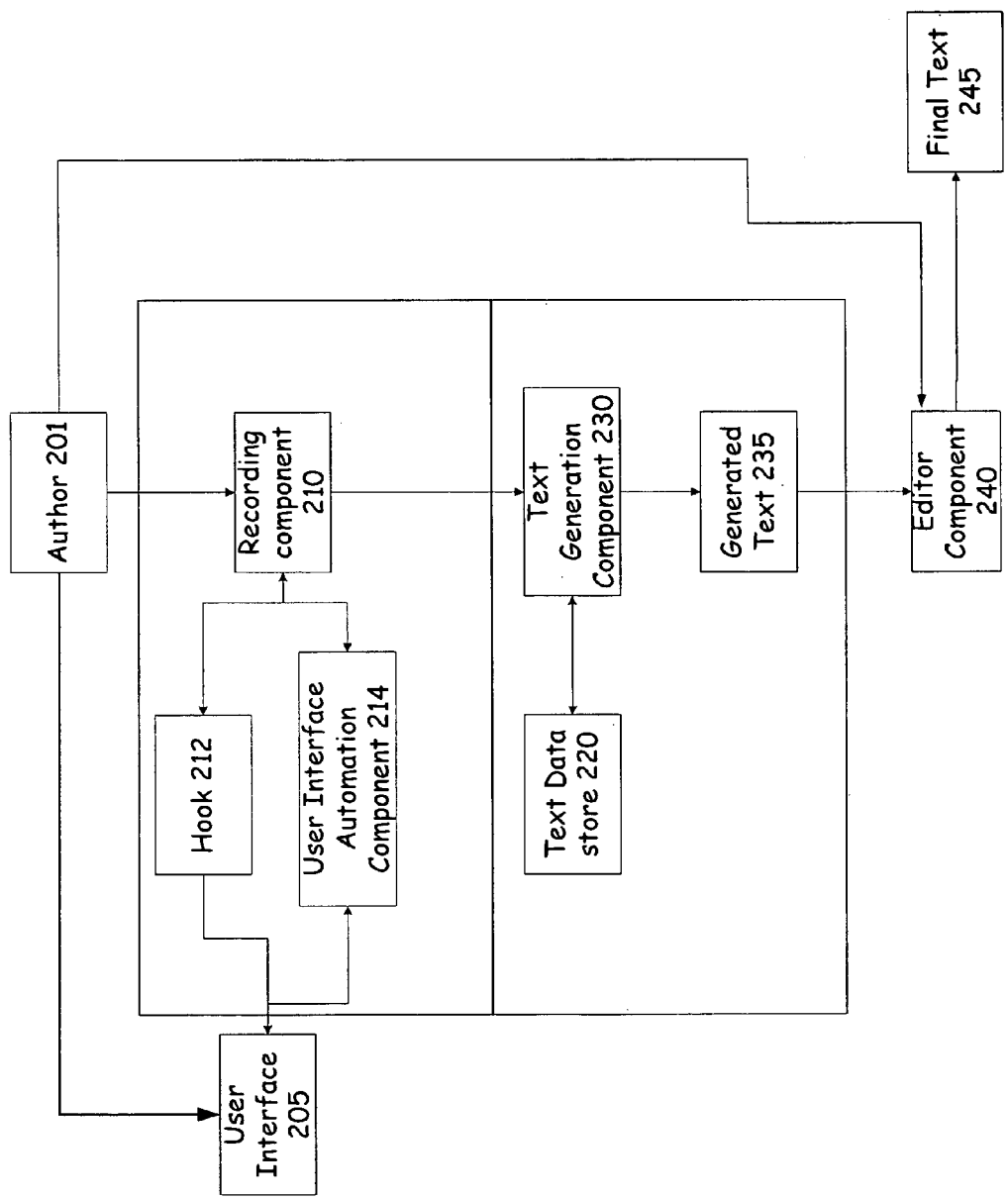
FIG. 2 is a block diagram illustrating the components of a recording system in accordance with one embodiment of the present invention.

FIG. 2 is a block diagram illustrating the components of a recording system 200 according to one embodiment of the present invention. FIG. 2 also shows system 200 with recorder 207 and automatic text generator 203. The recorder 207 includes a recording component 210, a hook component 212, and a user interface (UI) automation component 214. The text generator 203 includes a text database (or data store) 220, and text generation component 230. System 200 interacts with a user interface 205. An author can configure the components of system 200 to automatically record images corresponding to actions performed on the controls of user interface 205, and text generator 203 automatically generates text 235 that describes those actions. Author 201 can also edit the automatically generated text 235, or generate text from scratch, on editor 240 to obtain final text 245 describing the task (or UI control actions). Final text 245 can also illustratively include the images embedded therein. A number of the components in FIG. 2 will now be described in greater detail.

User Interface 205 is, in one embodiment, a conventional graphical user interface with controls that allow a user to take actions to perform a task. The user interface 205 is illustratively displayed on display device 191 shown in FIG. 1. This type of graphical user interface (GUI) is a widely used interface mechanism.

Recording component 210 is in one embodiment an application program that allows the author 201, or another user, to perform a task on the user interface 205, and records the tasks by capturing images of each step in the task. As is described in more detail below, while the author 201 is performing the steps associated with the task on the user interface 205, the recording component 210 records information about what controls and windows the author interacts with on the user interface 205. This information is illustratively provided to the text generator 230 to automatically generate the text in a document, such as a help document.

The recording component 210 interacts with the user interface 205 through the hook component 212 and the user interface (UI) automation component 214. These components can be separate from the recording component 210, or in some embodiments these components can be integral with the recording component 210.

The hook component 212 is, in one embodiment, a module or component within an operating system that is used by the computer. When a hook is set for mouse clicks, for example, information indicative of the mouse click (such as a message) is forwarded to the hook component 212 where it is consumed, and after its associated images have been recorded by the recording component 210, it is played back for other components in the computer that have registered to receive mouse clicks. Therefore, generally, the hook component 212 acts as a buffer between the operating system and the target application.

The hook component 212 can be configured to look for substantially any input action, such as the type of signal received, e.g. single click, double click, right or left click, keyboard action, touch-sensitive screen input, etc. Once the information representing the action is recorded by the recording component 210, the information representing the mouse click (or whatever action is recorded) is then played back by the hook component 212 to the application. One reason for this is that the user may take a second action before the first action is recorded. The second action may well cause the state of the user interface to change, and thus result in improper recording of the first action. By consuming the first mouse message and playing it back once recording is complete, this ensures that the first action will be recorded properly.

It should also be noted that the functions performed by the hook component 212 (i.e., listening for mouse clicks and playing them back) are illustratively performed on separate threads. This ensures that all user interface actions (e.g., mouse clicks, keyboard actions etc.) will be properly recorded and played back without missing any. Further, the record and playback mechanism of hook component 212 can illustratively override any timeout features that are implicit within the operating system. This can be necessary if the timeout period of the operating system is too short to allow for proper recording of the action.

User interface automation component 214 is illustratively a computer program configured to interpret the atomic steps for the overall task performed by the author or user through the user interface 205. In one embodiment, user interface automation component 214 is a GUI automation module implemented using Microsoft User Interface Automation by Microsoft Corporation of Redmond, Wash. This module provides a programmatic way to access information about the visible user interface, and to programmatically interact with the visible user interface. However, depending on the system setup, the user interface automation component 214 can be implemented using any application that is able to programmatically navigate a graphical user interface and to detect (and optionally programmatically navigate the GUI to perform and execute) commands on the user interface.

User interface automation component 214 thus detects each of the steps associated with the desired task performed on the user interface 205 by author 201 (or another user) in task order. For instance, as is described in greater detail below, when the task requires the user to click a button on the GUI to display a new menu or window, user interface automation component 214 determines which control is located at the position of the mouse cursor on user interface 205 and its size and its parent window. The recording component 210 uses information from hook component 212 (e.g., the type, name and state of the control) to record the name and properties of the control that was used to perform the step. This information is provided from the user interface automation component 214 and hook component 212 to the recording component 210 such that the recording component 210 can record the image of the button or the control that was used by the author to perform the step. Obtaining the image is described in greater detail below with respect to FIG. 3.

Text generation component 230 is a program or module configured to generate natural language text that describes the actions executed or performed during the recording process. The text generation component 230 uses the recorded images and other information recorded by the recording component 210 to search database 220 and to choose a correct template or entry from the text database 220 that corresponds to the recorded step.

Text database 220 is illustratively a database or other information storage system that is searchable by the text generator 230. Text database 220 contains information related to the controls that are available on the user interface 205. This information can include, for example, the name of the control, the type of control, the action performed on the control, and a textual description of the action as a natural language sentence.

In some embodiments the textual description for the entry is provided in multiple languages. When the textual description is provided in multiple languages, a language identifier is provided with each entry that allows the correct language to be selected.

However, depending on the needs of the system, other information can be provided in the text database 220. In one embodiment, some entries in the text database 220 have information related to two or more actions exemplified by multiple controls that are performed in sequence. Where multiple actions on multiple controls are represented by a single entry in the text database 220 the text for the entry contains natural language descriptions of the action performed on both controls as a single sentence. By combining the description of the two commands as a single sentence, the readability of the final text document is improved.

In one embodiment, the text database 220 is written in Extensible Markup Language (XML). The data for each entry can be stored as a series of subentries, where each subentry of the entry refers to an individual piece of information that is needed to identify the task. However, other formats can be used for storing the data.

In one embodiment, the text generation component 230 looks at two or more of the recorded actions when searching for entries in the text database 220. This can be done in order to provide a more fluid text document. For instance, good procedural documentation often combines more than one step into a single sentence as an enhancement to readability. If the text generation component 230 identifies two or more that match the recorded information in the text database 220, the text generation component 230 can use any known method to determine which entry in the database to choose, such as by disambiguating the entries based on scoring each entry, and selecting the entry that has the highest score.

According to one embodiment, based on the type of the control actuated on the user interface, and the performed action, the text generation component 230 searches the text database 220 for an entry that matches the executed control type and action. Once a match is identified in the text database 220, the text generation component 230 obtains the associated natural language description of the action from the text database 220, and places it as a sentence instruction in the generated text document 235. In an alternative embodiment, the text generation component 220 can also generate an executable version of the text document based on the information provided by the UI automation module 214.

When choosing a textual description from the text database 235, the text generation component can also look to the state of the control. This can be important when the control is a checkbox or an expandable or collapsible tree. In this case merely clicking on the box may not be appropriate to describe the action, as the action on the control is the same regardless of the desired result. Therefore, in these cases, the new state of the control will influence the selected text. For example, if the control is a check box and it is to be deselected, the text matched would be based on the new state of the control plus the control's name.

Text editor 240 is an editor configured to correct, change, or add information or text to the automatically generated text 235. Depending on the resultant text generated by text generator 230, and the actions performed by the author, it may be necessary to edit the text to further enhance its understandability. Therefore, text editor 240 receives the generated text 235, and allows the author 201 to edit the generated text.

Text editing may be required, for example, because of a grammatical necessity or because one of the recorded steps required a user action, and the system did not request the description of the user action at the time it was recorded. In such a case (when a user input is required), while performing the task to be recorded according to one embodiment, the text generator 235 only provides a space in the text for the author to provide an instruction/description of what the user should do at this step.

For example, assume that the task being performed by the user and recorded by the recording component is to change the background paneling on the computer screen. This requires the user to choose a pattern for the background. Therefore, the text that is returned by the text database for a recorded user action to change the background can be "Please select [insert description of action]", where the author will then edit the text to read "Please select the desired background from the list." Also during the editing stage the author 201 can provide a description of the overall task if this was not provided prior to recording the task. Once the text has been edited the final text 245 is output from the authoring tool 200 and is stored in an appropriate storage mode that allows for the final text to be retrieved by a user when desired.

Figure 3:
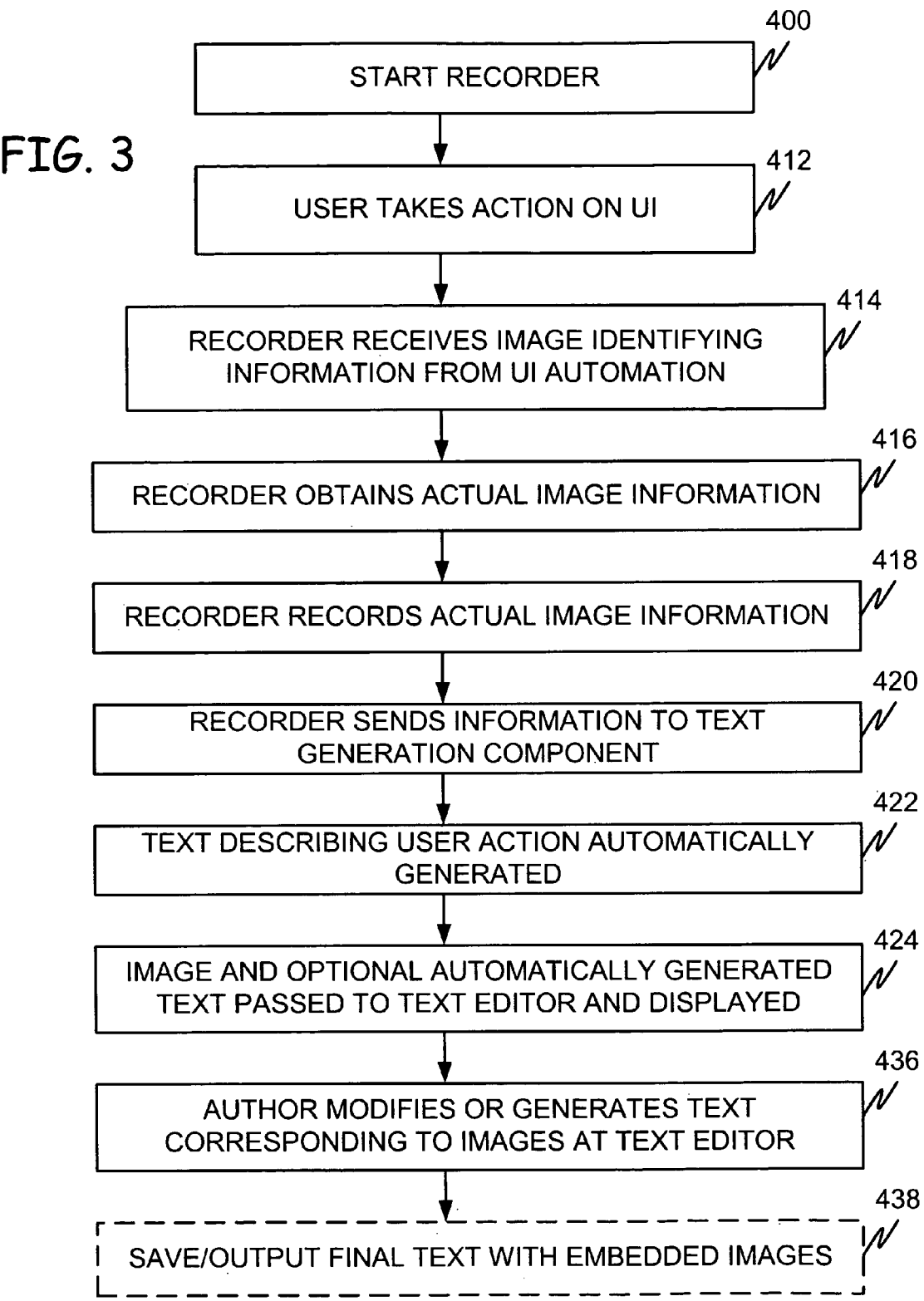
FIG. 3 is a flow diagram illustrating the operation of the system shown in FIG. 2 in recording and generating text related to user actions.

FIG. 3 is a flow diagram illustrating how system 200 operates in greater detail, in accordance with one embodiment of the invention. First, author 201 starts recording component 210. This is indicated by block 400 in FIG. 3. In order to do this, author 201 simply actuates a control, such as control 402 shown in FIG. 4. Record button 410 can be actuated by author 201 in order to begin recording. Stop button 406 is actuated to stop recording. As will be described below, author 201, can insert a description of user actions during text editing in text editor 240. In order to do this, the user actuates button 408. Similarly, as described below, author 201 can edit automatically generated text. This can be done by actuating text button 410 in FIG. 4. Additionally, in some embodiments, an additional button can be provided to allow the user to set a value. This is to allow correct text to be generated in instances when, for instance, at runtime, the user may be required to type a text into an edit box. Of course, other or different controls can be used as well.

Referring again to FIG. 3, once author 201 has started recording component 210, the system simply waits for a user to take an action on user interface 205. It will be noted that FIG. 2 shows that the user is author 201, but the user could be a different user as well.

Once the user has taken an action on user interface 205 (such as by manipulating a control element on the user interface) hook component 212 receives a message or other signal indicative of the user action. As discussed above, with respect to hook component 212, hook component 212 consumes the message and places it on a queue for recording. The user taking an action on UI 205 is indicated by block 412 in FIG. 3.

Recording component 210 then receives image identifying information from UI automation component 214. This is indicated by block 414 in FIG. 3. In one illustrative embodiment, UI automation component 214 provides recording component 210 with a number of items of information that allow recording component 210 to record images on the display screen which represent, or correspond to, the action taken by the user at user interface 205. In one illustrative embodiment, these items of information are the position of the control element on the display screen that the user has actuated or otherwise manipulated, the size of that control element, and the parent window that contains the control element.

Recording component 210 then obtains actual image information indicative of the screen shots associated with the user interface 205 and corresponding to, or reflecting, the action taken by the user. This is indicated by block 416 in FIG. 3.

In order to perform this step, recording component 210 can do a number of things in order to enhance the operation of the system. For instance, recording component 210 may determine that it would be helpful to record actual image information (or the actual screen shot) of more than just the control element manipulated by the user. This may be true, for example, if there is more than one similar control element currently on the display being manipulated by the user. Assume, for instance, that the user has clicked an "OK button" on the user interface. However, there may be more than one "OK button" on the display screen at that time. Therefore, in order to disambiguate among the various "OK buttons", recording component 210 may obtain the actual screen shot information for not only the particular "OK button" manipulated by the user, but for a desired number of pixels around that "OK button". This provides an image with greater context than simply an image of the control itself.

Similarly, recording component 210 may also record the screen shot image of the entire parent window that contains the control element. Of course, this contains a great deal of extra context which can be used to specifically identify the control element that the user has manipulated.

In order to determine whether additional context needs to be recorded by recording component 210, recording component 210 can make this determination using any of a wide variety of different techniques. For instance, recording component 210 can deploy heuristics that will identify an amount of context to be recorded. The heuristics may be based on the size and shape of the control element manipulated, the particular function of the control element manipulated, the position of the control element on the screen (for instance, if the control element is in the upper left hand corner recording component 210 may take more pixels on the lower and right hand sides of the control element), or the heuristic can simply reflect a fixed number of pixels which are to be taken around the control element, regardless of where it is located and what functions are performed by the control element.

Recording component 210 can obtain the actual screen shot image information using any known technique. For example, in most operating systems, there are published application programming interfaces (APIs) that allow an application or other computing component to obtain the screen shot information currently being displayed. Therefore, in one illustrative embodiment, recording component 210 simply makes an API call to obtain the information, once it knows the coordinates of the screenshot image information it desires, and the amount of context information and optionally the parent window of the control element.

Having obtained the actual image information, recording component 210 records it for later use. This is indicated by block 418 in FIG. 3. Of course, it will also be noted at this point that recording component 210 can record other information provided by UI automation component 214. For instance, UI automation component 214 illustratively provides recording component 210 with the control name, the control type, the action performed on the control, the type of manipulation performed (such as mouse click, mouse wheel rotation, keyboard keystrokes, touch pad input, etc.). This information can all be recorded by recording component 210.

In accordance with one embodiment of the present invention, text generation component 230, in conjunction with text database 220, automatically generates text associated with the images captured, and associated with the action taken by the user on user interface 205. In the embodiment in which these items are used, recording component 210 sends the actual image information captured to text generation component 230. This is indicated by block 420 in FIG. 3. The automatically generated text illustratively provides a written procedure which corresponds to step by step instructions for each user manipulation of user interface 205 in order to perform an overall task that requires multiple manipulations of user interface 205.

One embodiment for automatically generating text is described below with respect to FIGS. 5–8. Briefly, in order to generate this text, text generation component 230 can use any suitable method. In one illustrative method, text generation component 230 searches text data store 220 for entries that correspond to the information received from recording component 210. For instance, text data store 220 may illustratively be an XML database containing a plurality of entries that include the type of control or other item manipulated by the user on user interface 205, the type of action, and a text corresponding to that action. Of course, other data storage methods can be used to implement data store 220, and data store 220 can contain additional or different information as well.

For example, assume that the information received from the recording component 210 indicates that the user has clicked on (or otherwise invoked) an "OK button". Then, text generation component 230 searches text data store 220 for an entry that matches this type of action. Once a match is found, text generation component 230 retrieves the text from that entry in text data store 220 that describes that type of action. The text may, for instance, simply say "click OK".

In any case, text generation component 230 illustratively automatically generates text describing the user action taken on user interface 205 and recorded by recording component 210. This is indicated by block 422 in FIG. 3.

The generated text is indicated by block 235 in FIG. 2. In one illustrative embodiment, the images recorded by recording component 210 are automatically embedded in the generated text 235, or are at least associated with the generated text 235 such that they can be recalled and displayed in conjunction with one another later in the process.

Next, the image data recorded by recording component 210 and the automatically generated text is provided to editor component 240. The images recorded by recording component 210 and automatically generated text are illustratively displayed on a display screen at editor 240 such that author 201 can generate text corresponding to those images.

Displaying of the images and the text generated by generation component 230 is indicated by block 424 in FIG. 3.

The author can then modify the automatically generated text or generate new text. This is indicated by block 436 in FIG. 3. Finally, the final text 245 is output or saved according to a desired format or schema. The final text 245 can optionally include the captured images embedded therein. This is indicated by block 438 in FIG. 3.

Figure 5:
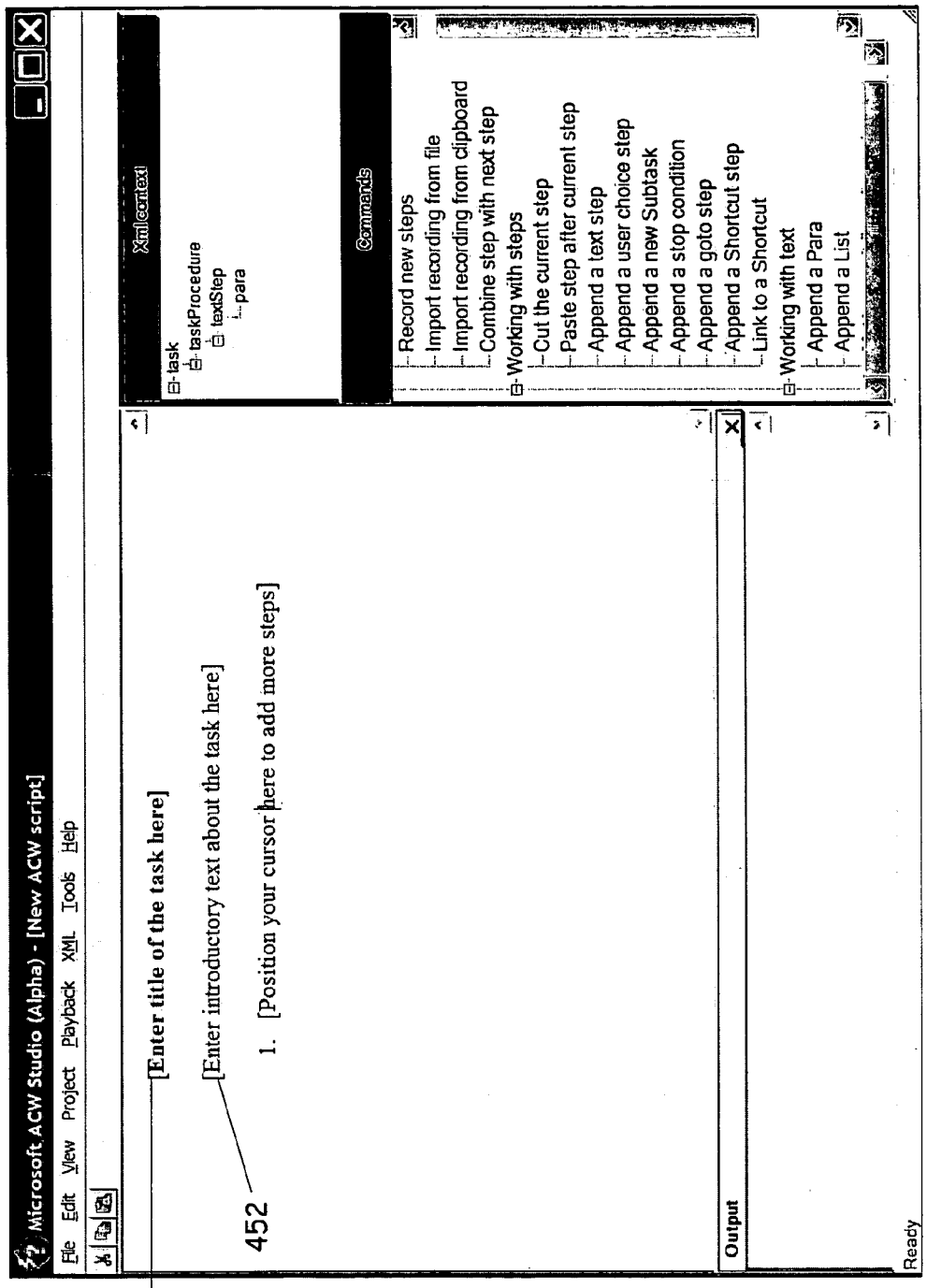
FIG. 5 is a screen shot illustrating an exemplary display that can be used for generating text.
Figure 6:
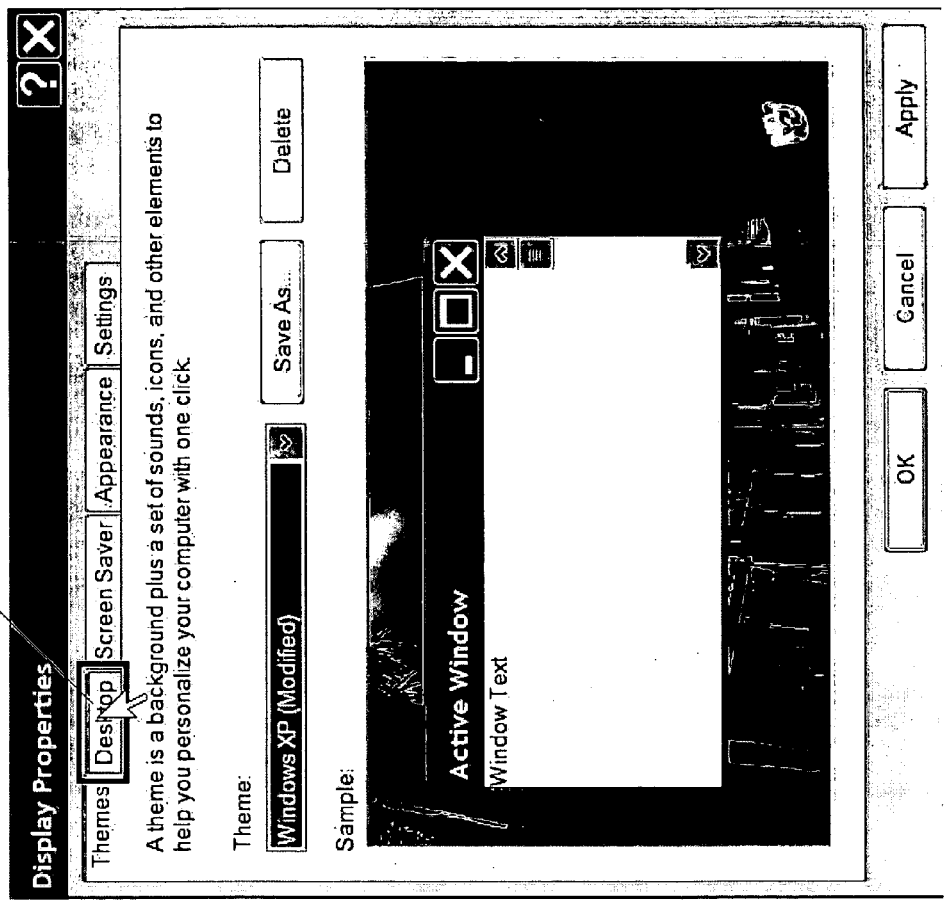
FIG. 6 is a screen shot illustrating a highlighted feature in accordance with one embodiment of the present invention.

In order to set up system 200 to automatically generate text, the author activates recording component 210 by first opening a window similar to the one illustrated in FIG. 5. At this point the author can edit the portion of the screen indicated by lines 450 and 452, to include information such as a title of the document being created and any introductory information regarding the task. However, this information can be added to the text document during later editing.

As the system 200 begins to record images, UI automation component 214 determines the available user interface elements on the user interface 205. Also the recording component 210 provides an indication on the user interface of what control is currently identified as the control being accessed using information provided from the UI automation component 214. This highlighting of the control is illustrated by reference number 454 in FIG. 6.

Figure 7:
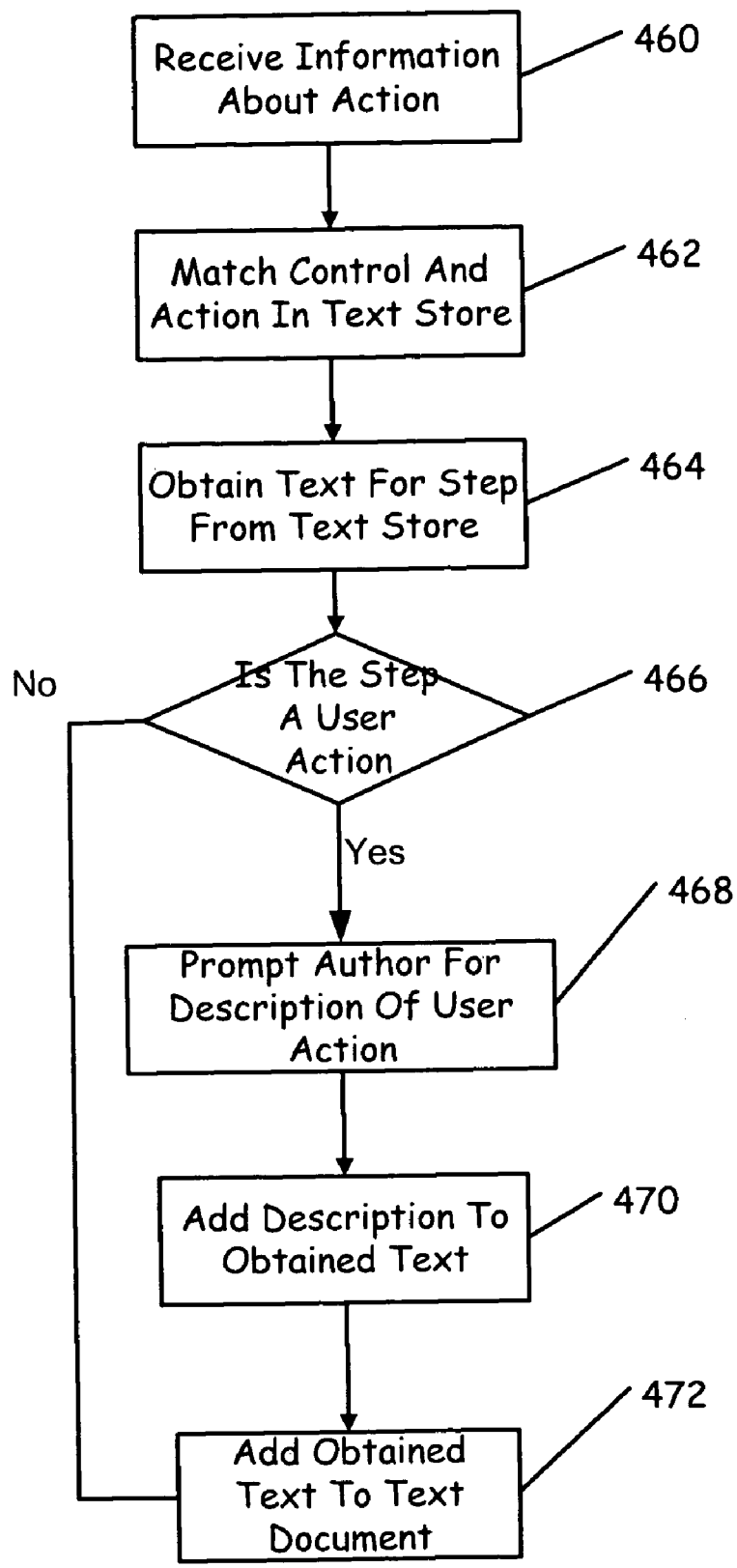
FIG. 7 is a flow diagram illustrating one embodiment of automatic text generation in greater detail.

FIG. 7 is a flow diagram illustrating in more detail the steps that are executed to generate text for a received, recorded step according to one embodiment of the present invention. Block 460 illustrates that the information related to the recorded step is received from the recording component 210 at the text generation component 230.

Once the information related to the recorded step has been received by the text generator component 230, the text generator component 230 proceeds to search the text database 220 for entries that match the received command. This is indicated by block 462. In one embodiment, text database 220 is an XML database containing a plurality of entries that includes the type of control or other item interacted with, the type of action, a new state of the control (e.g. checked, unchecked, expanded, collapsed, etc.) and a corresponding text for the action. However, other data storage methods can be used to hold the text. Further, other information can be held in text database 220. An example of a portion of the text database according to one embodiment is provided below in Table 1.

TABLE 1

```
<EnglishTemplate actionTypeID="value"
controlTypeID="check box" ActionText="Select"
specialValueID="checked">
    <Sentence>Select the <tag id="1"></tag>
checkbox</Sentence></EnglishTemplate>
    <EnglishTemplate actionTypeID="invoke"
controlTypeID="button" ActionText="Click">
    <Sentence>Click <tag
id="1"></tag></Sentence></EnglishTemplate>
  <EnglishTemplate actionTypeID="invoke"
controlTypeID="list item" ActionText="Double-click">
    <Sentence>In the <tag id="2"></tag> list, double-
click <tag id="1"></tag></Sentence></EnglishTemplate>
    <EnglishTemplate actionTypeID="expand_collapse"
controlTypeID="tree item" ActionText="Expand"
specialValueID="expanded">
    <Sentence>Click the minus sign next to <tag
id="1"></tag>to collapse
it</Sentence></EnglishTemplate>
```

For example, assuming that the information received from the recording component for the command was action type="invoke" control type="button" control name="click OK"", then the text generation component 230 searches the text database 220 and finds an entry that matches this information. Then it retrieves the text from the entry corresponding to "click OK". Obtaining the text associated with the matched entry is illustrated at block 464.

Figure 4:
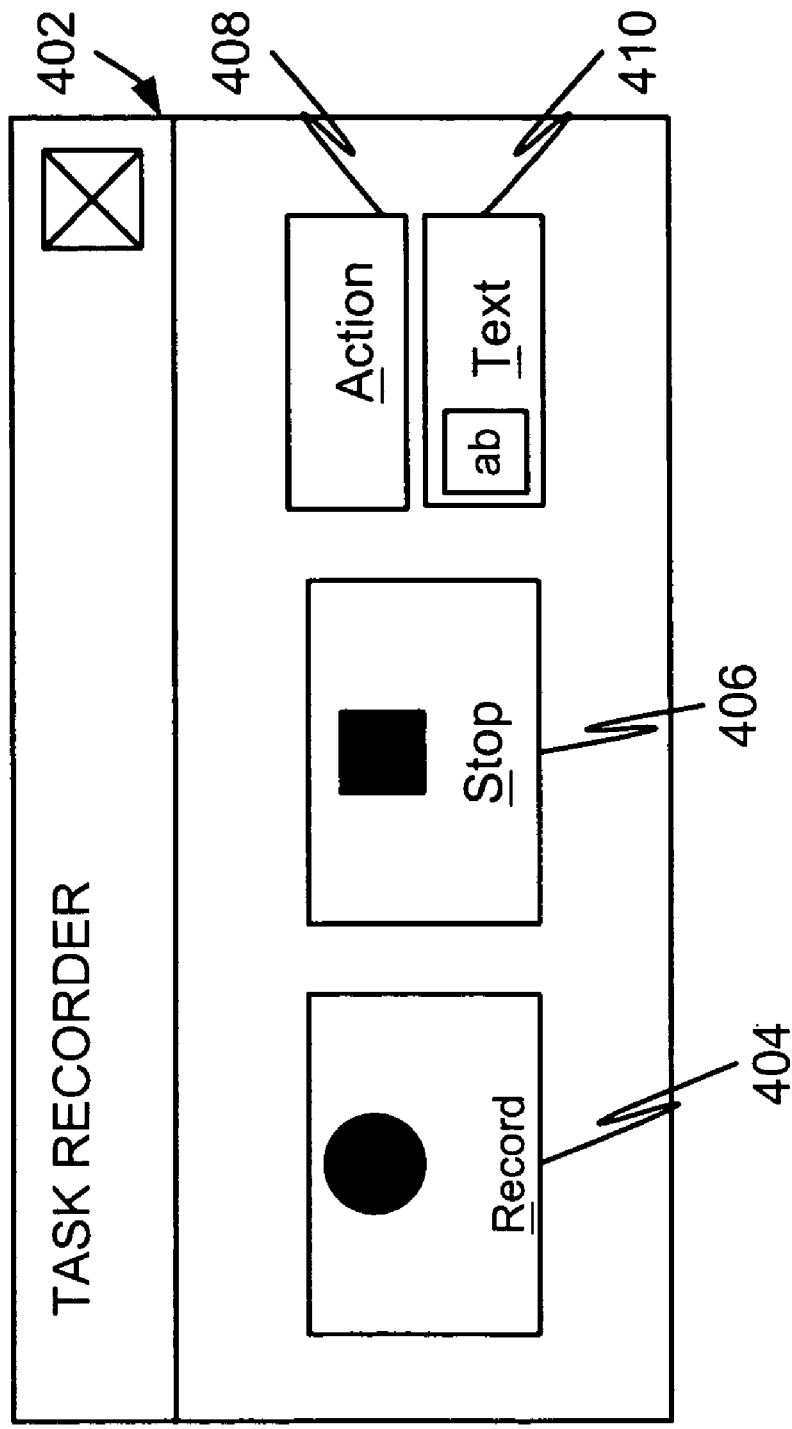
FIG. 4 is a screen shot depicting one embodiment of a control for the recording system.

During the recording of the step in question, if the author designated the step a user action step by selecting the user action button 408 on the user interface 402 shown in FIG. 4, or if the entry in the text database 220 indicates that the action is a user action, the text generating component 230 can, in one embodiment, prompt the author to add a description of the action to the obtained text. This is illustrated at block 466. The author can then provide the desired text at block 468. However, the author can ignore this step and add the information later during the editing stage. Any added text is added to text 235 at block 470.

If there is no user action required, or the necessary user action information has been provided by the author, the text generator 230 adds the newly obtained text to the text document. This is illustrated at block 472.

Figure 8:
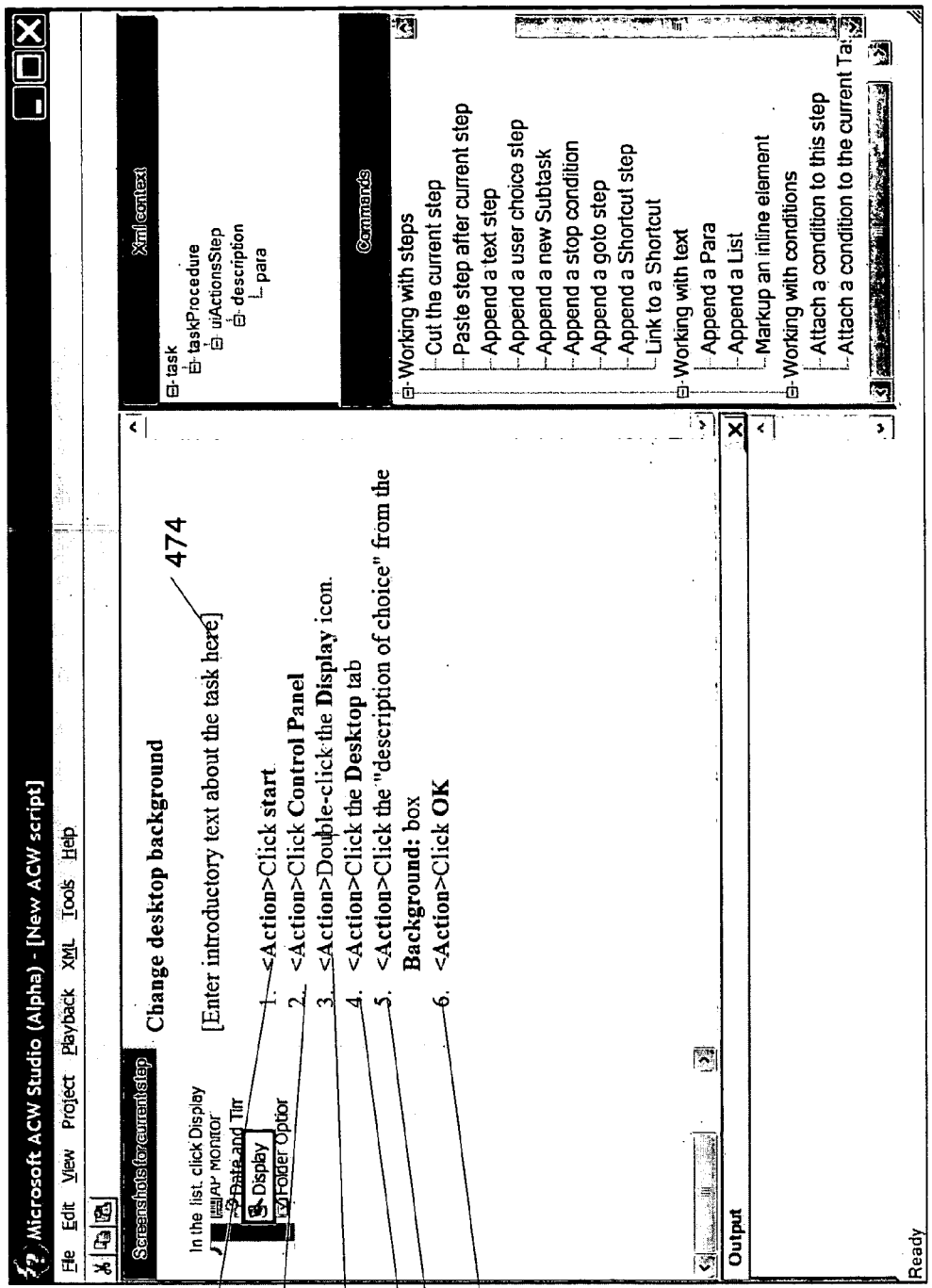
FIG. 8 is a screen shot illustrating one way of presenting generated text to an author for editing.

An example of the generated text is illustrated in FIG. 8 by reference numbers 474–486. This text provides the user with the step-by-step instructions for the desired task. The text can be generated as described with respect to text database 220 and text generation component 230, or according to any method that allows for the automatic generation of text from received input commands. The automatically generated text can then be presented to the author, along with the captured images, for editing.

Figure 9:
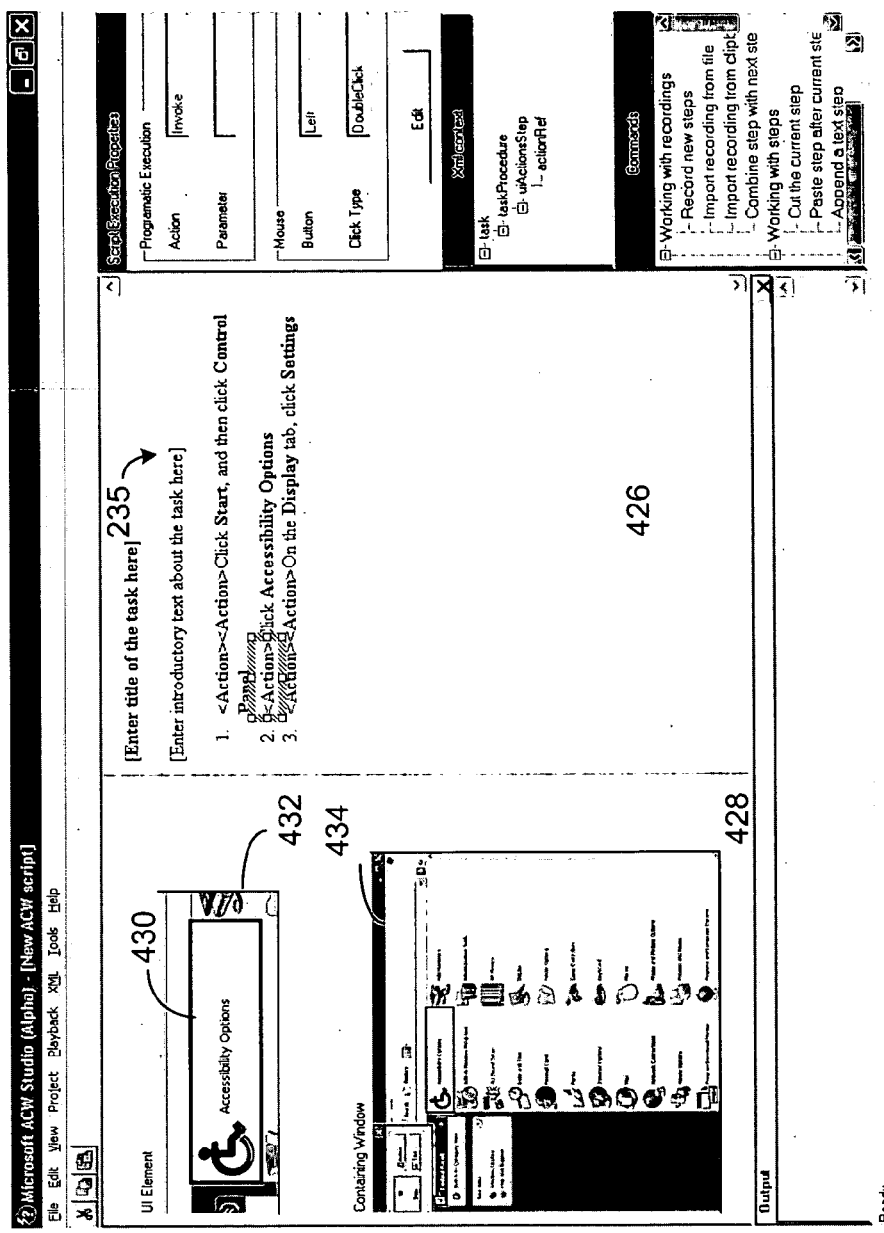
FIG. 9 is a screen shot better illustrating one embodiment in which images can be used to author content.

FIG. 9 is a screen shot illustrating one way in which the captured images and automatically generated text can both be displayed to author 201 at editor 240. FIG. 9 includes two primary portions that relate to the present invention. The first portion comprises text display portion 426 and the second portion comprises image display portion 428. Text display portion 426 displays the optional automatically generated text 235, or text which is authored by author 201. Image display portion 428 displays the captured screen shot images recorded by recording component 210.

In the embodiment in which text is automatically generated, that text is shown at 235 in display portion 426, and it can be edited by the author using editor component 240 (one screenshot of which is shown in FIG. 9). Thus, the author can highlight each of the actions or other items displayed on display portion 426. The images associated with the highlighted item are displayed in display portion 428. Therefore, in the embodiment shown in FIG. 9, the author has highlighted action number two which corresponds to actuating the Accessibility Options control and the corresponding images are displayed in display portion 428. The user can then enter text or modify text, as desired, in order to obtain a full description of the step performed by the user at user interface 205. In the embodiment shown in FIG. 9, the user has actuated the Accessibility Option control 430 on user interface 205. It can be seen that recording component 210 has obtained not only the control box 430 corresponding to the Accessibility Options control, but a larger context box 432 containing a number of pixels surrounding the Accessibility Options button 430. Context box 432 displays additional context around Accessibility Options control 430 such that it can be more easily located on the screen.

FIG. 9 also shows that recording component 210 has obtained the parent window 434 that contains Accessibilities Options control 430. Therefore, the author can see exactly which control was manipulated by the user on user interface 205, and where that control resides on its parent window.

This greatly assists the author in generating or modifying text describing the actions taken on the user interface.

Figure 10:
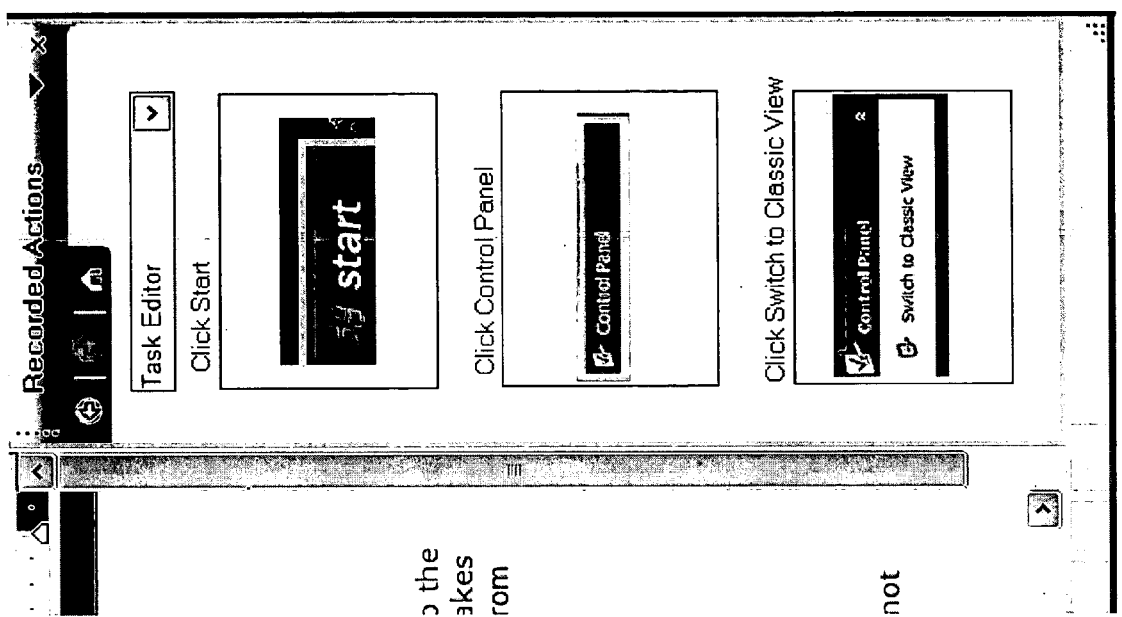
FIG. 10 illustrates one embodiment of a final text with embedded images in accordance with one embodiment of the present invention.

It will be appreciated that the present invention, as discussed to this point, can be used in a wide variety of different ways. For instance, the present invention can be used to generate content (such as help content) in which the captured images are embedded in the text or in the help text. One example of this is shown in FIG. 10. It can be seen that each step in a process not only contains text describing what to do to accomplish that step, but a visual image indicating where that step is to be performed. In this embodiment, in which the invention is used to generate embedded images in text, the final text 245 is output with embedded images. This is indicated by the optional block 438 in FIG. 4.

However, the present invention need not be used to embed images in text. Instead, the present invention can simply be used to display the captured images to an author, where the author is generating a written description of the steps taken and for which images are captured. For instance, the author may be generating text describing a process by which a virus is to be repaired or removed from a computer. The author may not wish to include embedded images in that text. In that case, the images are simply displayed and optionally the automatically generated text is also displayed to the author, and the author can either generate text from scratch or modify the automatically generated text, in an embodiment in which it is provided.

In any case, final text 245 will illustratively be created in, or translated into, whatever schema the content will finally be published in. This can, for example, be Microsoft Assistance mark up language (MAML), HTML, or some other XML format.

Figure 11:
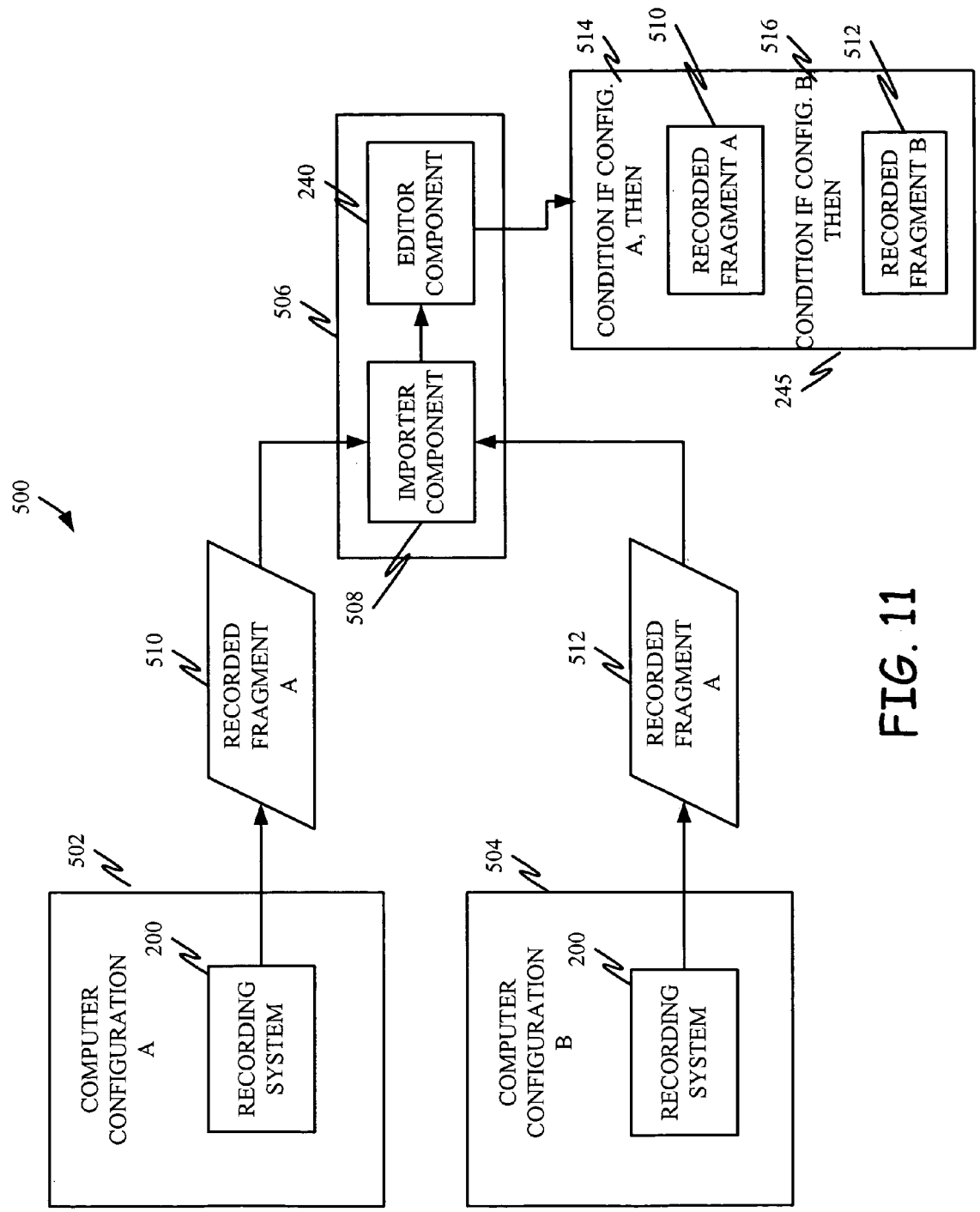
FIG. 11 is a block diagram of one embodiment of a system for recording user interface steps to perform tasks on systems with different configurations.

FIG. 11 is a block diagram of a system 500 for generating content (such as final text 245) that describes steps taken by a user to perform a task on two different systems (or on systems with two different configurations). As discussed in the background, prior systems for generating content to describe steps to be taken by a user to perform an overall task have suffered from the fact that the steps that must be taken to perform any given task may change based on the configuration of the computer on which the task is to be performed.

Therefore, even if images indicative of the steps to be performed are captured, and even if text is automatically or manually generated to describe those steps, the steps may well change based on the particular operating system being run by the computer or based on any other differences in configuration of the computer. In fact, the steps required may even be different if the version number of the operating system, or other software run by the computer, is different. Of course, a wide variety of other differences in configuration can make the steps required to perform a given task different as well. For instance, the user interface can differ for different states of the machine. By way of example, the sequence of user interface steps to connect to a remote machine can be different depending on whether the computer is on a network domain or on a work group.

Therefore, to automatically record the steps required to perform a given task, the recording system shown in FIG. 2 should record the steps on machines configured with all the different configurations that the content is intended for. The recorded steps for performing the task, recorded on all these different configurations, should then be combined into one overall content set that describes how to perform the task under the different configurations. Optionally, the system that eventually displays the content to the user will detect the configuration of the user's system and display only the relevant content (e.g., only those steps relevant to the end user).

Thus, system 500 shows a first computer 502 and a second computer 504 each of which includes a recording system 200 such as that shown in FIG. 2. Computer 502 is illustratively configured according to a first configuration designated herein as configuration A. Computer 504, on the other hand is configured according to a second configuration designated herein as configuration B.

The configurations A and B can be any type of different configurations that affect the steps required to perform any given task that is to be recorded, and for which content is to be authored. Therefore, by way of example, configuration A might be a computer that is on a network domain, while configuration B is a computer on a work group. Similarly, configuration A might be a computer running on a first operating system, while configuration B is a computer running on a second operating system. Similarly, configuration A might be a computer operating on one version of an operating system while configuration B is a computer operating on a different version of the same operating system. Other, different configurations can be used as well, as desired by the author of the content. It should also be noted, of course, that computers 502 and 504 can actually be different computers or computers installed on virtual machines.

Recording systems 200 shown in FIG. 11 can be similar to that shown in FIG. 2 and they are correspondingly numbered. However, as will be described in greater detail below, the automatic text generation portion 207 can be disposed on authoring computer 506, in which case only one automatic text generation portion 207 is required.

Computers 502 and 504 are illustratively connected to an authoring computer 506. Authoring computer 506 illustratively includes an importer mechanism 508 and a content editor component (such as editor component 240 described with respect to FIG. 2).

Authoring computer 506 can illustratively be either computer 502 or 504, or a different computer. Similarly, computer 506 can run on the same operating system as one of computers 502 and 504, or on a different operating system. In addition, as mentioned above, editor component 240 can be provided with automatic text generation system 207, or it can simply be the editor component 240 described with respect to FIG. 2.

In operation, recording systems 200 on computers 502 and 504 allow a user to perform tasks on the user interfaces associated with each of computers 502 and 504, while recording systems 200 record and store the user interface steps that are taken to perform the desired task. Recording systems 200 thus illustratively record screen shot images corresponding to the actions taken by the user, and can also optionally automatically generate text corresponding to those images, as described above.

Recording systems 200 then illustratively format the recorded steps into a format that is acceptable by importer component 508. For instance, recording system 200 on computer 502 will illustratively record a series of steps conducted by a user on the user interface of computer 502 to perform the given task and format those recorded steps into recorded fragment A (also designated by numeral 510) according to an XML format. Similarly, recording system 200 on computer 504 will illustratively record steps and format them into a recorded fragment B (also designated by numeral 512) according to an XML format.

Recorded fragments 510 and 512 are then provided from computers 502 and 504 to importer component 508. Importer component 508 is shown on computer 506, but it will of course be appreciated that importer component 508 may be a component which has functionality distributed among the various computers shown in system 500, or which resides discretely from all of those computers, or which is provided on a different one of the computers, other than computer 506. In any case, importer component 508 can be any suitable importing mechanism for receiving recorded fragments 510 and 512 and providing them to editor component 240 for presentation to the user.

Importer component 508 illustratively stores recorded fragments 510 and 512 on recording computer 506 and imports them into editor component 240 in one of a variety of different ways. This can be accomplished, for example, by importing fragments 510 and 512 through a shared directory. Similarly, it can be done by storing recorded fragments 510 and 512 on disk or another external memory device wherein that external memory device is physically transported to computer 506 where fragments 510 and 512 are loaded into editor component 240. Similarly, computer 506 can be used remotely to operate computers 502 and 504 and then store recorded fragments 510 and 512 on a clipboard or other shared application space which can be accessed by computer 506. One embodiment of such a shared space is the Windows Clipboard system provided by Microsoft Corporation of Redmond, Wash.

In the embodiment in which fragments 510 and 512 are provided using a shared application space, computer 506 reads the fragments 510 and 512 from the shared application space and imports them into editor component 240. For instance, in the embodiment in which the Windows Clipboard application space is used, a program referred to as Remote Desktop also provided by the Microsoft Corporation of Redmond, Wash., allows the clipboard space to be shared between remote and local computers (such as between computers 502 and 504 and computer 506).

In any case, importer component 508 is used to import recorded fragments 510 and 512 into editor component 240. In the embodiment in which the recording systems 200 on computers 502 and 504 include automatic text generating system 207, the recorded fragments 510 and 512 will include the automatically generated text. Alternatively, the text can be automatically or manually generated at editor component 240.

Editor component 240 displays the fragments 510 and 512 to the user and thus allows appropriate conditions to be inserted by the user. For instance, the embodiment of final text 245 illustrated in FIG. 11 shows recorded fragment 510 and recorded fragment 512 inserted in the overall text 245 after condition statements 514 and 516 have been inserted by the user. Condition statement 514, for instance, is "Condition: If configuration A, then:". This indicates that the steps indicated by recorded fragment 510 are to be displayed to the user or performed automatically if the computer is configured in configuration A.

Condition 516 states "Condition: if configuration B, then:". This indicates that if the computer is configured according to configuration B, then the steps indicated by recorded fragment 512 are to be displayed to the user or performed.

Of course, it will also be appreciated that the author can delete or modify the text in any other desired way as well. This can be done using conventional editing techniques on editor component 210.

Table 2 shows an exemplary XML document formed from recordings from two different configurations. The two XML fragments are recorded on computers where one runs on a network domain and the other on a network workgroup. Note that the condition="Network_connection: domain" attribute is marked up to handle the if-then logic for determining which fragment to run.

TABLE 2

```
<task>
    <title>Add a new user to the computer</title>
    <introduction>When you add a user to your computer, you are allowing that individual
to have access to files and programs on your computer.</introduction>
    <commandStep>
        <command>control.exe userpasswords</command>
        <description>Open User Accounts in Control Panel</description>
    </commandStep>
    <!--- *** This section was recorder on a machine that's on a network domain *** -->
    <stepGroup condition="Network_connection:domain">
        <uiActionsStep><actionRef id="0"/><actionRef id="1"/>
            <description>On the <ui>Users</ui> tab, click Add</description>
        </uiActionsStep>
        <uiActionsStep><actionRef id="2"/>
            <description>Follow the instructions in the wizard to add a new user</description>
        </uiActionsStep>
    </stepGroup>
    <!--- *** This section was recorder on a machine that's on a workgroup *** -->
    <stepGroup condition="Network_connection:workgroup">
        <uiActionsStep><actionRef id="3"/>
            <description>Click <ui>Create a new account</ui></description>
        </uiActionsStep>
        <uiActionsStep><actionRef id="4"/>
            <description>Type a name for the new user account</description>
        </uiActionsStep>
        <uiActionsStep><actionRef id="5"/>
            <description>Click Next</description>
        </uiActionsStep>
        <uiActionsStep><actionRef id="6"/>
            <description>Click either Computer Administrator or Limited depending on the type
of account you want to assign the new user</description>
        </uiActionsStep>
        <uiActionsStep><actionRef id="7"/>
            <description>Click create</description>
        </uiActionsStep>
    </stepGroup>
</task>
```

Thus, it can be seen that the present invention allows an author to record all or parts of macros (or another series of steps to perform a given task) on different machines under different configurations, and then to assemble the recorded pieces on one authoring machine to arrive at a final content. This allows the macros to be recorded on different machines, but the main authoring steps can be performed at one place. This renders authoring of content less expensive and less complex, and more highly automated, than prior systems.

Although the present invention has been described with reference to particular embodiments, workers skilled in the art will recognize that changes may be made in form and detail without departing from the spirit and scope of the invention.

What is claimed is:

1. A method of generating content indicating steps taken on a user interface to perform a task, the method comprising:
    receiving a first user input indicative of user manipulation of a user interface element on a user interface of a first computing device in a first configuration;
    recording, in response to the first user input, first information indicative of the manipulation of the user interface element on the first computing device;
    receiving a second user input indicative of user manipulation of a user interface element on a user interface of a second computing device in a second configuration;
    recording, in response to the second user input, second information indicative of the manipulation of the user interface element on the second computing device; and
    combining the first and second information to obtain the content.

2. The method of claim 1 wherein combining is performed on a third computing device.

3. The method of claim 1 wherein combining is performed on one of the first and second computing devices.

4. The method of claim 1 and further comprising:
    automatically generating a first text corresponding to the first user input; and
    automatically generating a second text corresponding to the second user input.

5. The method of claim 4 wherein automatically generating the first text is performed on the first computing device.

6. The method of claim 4 wherein automatically generating the second text is performed on the second computing device.

7. The method of claim 1 wherein the content comprises a description of the steps performed to accomplish the task on computing devices having the first and second configurations.

8. The method of claim 1 wherein the first information comprises a first image of at least a portion of the user interface element manipulated on the user interface of the first computing device and wherein the second information comprises a second image of at least a portion of the user interface element manipulated on the user interface of the second computing device.

9. The method of claim 8 wherein combining comprises:
    displaying the first and second images on an editor component configured to receive a textual description of the user manipulations of the user interface elements on the first and second computing devices.

10. The method of claim 3 wherein combining comprises:
    embedding the first and second images in the textual description.

11. A content generation system for generating content describing steps taken by a user to perform a task on a user interface, comprising:
    a first recording system disposed on a first computing device having a first configuration, the first recording system being configured to receive an indication that a user has taken a step on the first computing device and to record first information indicative of the step;
    a second recording system disposed on a second computing device having a second configuration, the second recording system being configured to receive an indication that a user has taken a step on the second computing device and to record second information indicative of the step; and
    an editor component configured to receive the first and second information and combine the first and second information to form the content.

12. The content generation system of claim 11 wherein the editor component is disposed on a third computing device.

13. The content generation system of claim 11 wherein the editor component disposed on one of the first and second computing devices.

14. The content generation system of claim 11 wherein the first and second recording systems are configured to record the first and second information as first and second images, respectively, indicative of the steps performed by the users on the first and second computing devices.

15. The content generating system of claim 14 wherein the editor component is configured to display the first and second recorded images and receive associated text.

16. The content generation system of claim 15 wherein the editor component is configured to generate final content with the images embedded in the associated text.

17. The content generation system of claim 11 and further comprising: an automatic text generation system configured to receive the first information and automatically generate text describing the step performed by the user on the first computing device based on the first information.

18. The content generation system of claim 17 wherein the automatic text generation system is configured to receive the second information and automatically generate text describing the step performed by the user in the second computing device based on the second information.

19. The content generation system of claim 18 wherein the automatic text generation system is disposed on a third computing device.

20. The content generation system of claim 18 wherein the automatic text generation system comprises: a first automatic text generator disposed on the first computing device and generating text based on the first information; and a second automatic text generator disposed on the second computing device and generating text based on the second information.

* * * * *